United States Patent
Wolf et al.

(10) Patent No.: US 7,120,169 B2
(45) Date of Patent: Oct. 10, 2006

(54) NETWORK DEVICE AND METHOD FOR DELAY COMPENSATION OF DATA PACKETS

(75) Inventors: Michael Joachim Wolf, Mundelsheim (DE); Werner Beisel, Ludwigsburg (DE)

(73) Assignee: Alcatel, Paris (FR)

( * ) Notice: Subject to any disclaimer, the term of this patent is extended or adjusted under 35 U.S.C. 154(b) by 1022 days.

(21) Appl. No.: 10/022,893

(22) Filed: Dec. 20, 2001

(65) Prior Publication Data

US 2002/0080823 A1    Jun. 27, 2002

(30) Foreign Application Priority Data

Dec. 23, 2000  (DE)  ................................ 100 64 988

(51) Int. Cl.
*H04J 3/06*   (2006.01)
*H04L 12/28*  (2006.01)

(52) U.S. Cl. .................. 370/503; 370/252; 370/516

(58) Field of Classification Search .............. None
See application file for complete search history.

(56) References Cited

U.S. PATENT DOCUMENTS

| | | | | |
|---|---|---|---|---|
| 4,998,242 A | * | 3/1991 | Upp ........................... | 370/392 |
| 5,142,529 A | * | 8/1992 | Parruck et al. .............. | 370/545 |
| 5,172,376 A | * | 12/1992 | Chopping et al. .......... | 370/509 |
| 5,335,223 A | * | 8/1994 | Iino ............................ | 370/503 |
| 5,717,693 A | * | 2/1998 | Baydar et al. .............. | 370/514 |
| 6,339,628 B1 | * | 1/2002 | Yoshida ...................... | 375/376 |

FOREIGN PATENT DOCUMENTS

| | | |
|---|---|---|
| EP | 0 858 192 A2 | 8/1998 |
| EP | 0 999 653 A2 | 5/2000 |
| JP | 5-292556 A | 11/1993 |

OTHER PUBLICATIONS

Y. Nakano et al, "Signal Processing for SDH Digital Cross-Connect System", Proceedings of the International Conference on Communications (ICC), Geneva, May 23-26, 1993, New York, IEEE—vol. 3, May 23, 1993, pp. 900-904, XP010136993.

* cited by examiner

*Primary Examiner*—Steven Nguyen
(74) *Attorney, Agent, or Firm*—Sughrue Mion, PLLC (57) ABSTRACT

A network device (NWE) for a digital transmission network with synchronous digital hierarchy receives data steams containing frames with data packets mapped therein and addressed by a phase reference identifier. Internally, the network device has redundant transfer paths which potentially cause different delay. The network element compensates for that delay by adjusting the phase reference identifier allocated to a respective data packet by a predetermined phase correcting value, leading in the phase, which corresponds to a maximum expected delay for transfer of the data packets on internal transfer paths, and by buffering the data packet by a buffering time such that its buffering time and its delay actually needed for passing through the network device in total correspond to the maximum expected delay taken into account by the phase adjustment.

18 Claims, 4 Drawing Sheets

NETWORK DEVICE AND METHOD FOR DELAY COMPENSATION OF DATA PACKETS

The invention is based on a priority application DE 10064988.2 which is incorporated by reference herein.

FIELD OF THE INVENTION

The present invention relates to the field of telecommunications and more particularly to a network device for delay compensation of data packets, in particular a network device for a telecommunications network with synchronous digital hierarchy, as well as to a method for delay compensation of data packets.

BACKGROUND OF THE INVENTION

In a transfer of data packets in a time multiplex process data packets are transferred within defined time slots or time channels, which can be repeatedly re-used for data transfer after a predetermined time. A group of time channels or else a single time channel provide so-called frames for transferring data packets. The frames in the synchronous digital hierarchy are, for example, referred to as synchronous transport modules (STM) and the data packets as so-called virtual containers. The so-called overhead or frame header of each frame contains phase reference identifiers, i.e., so-called pointers, for the data packets transported in the respective frame, which serve for determining the position of the corresponding packet within the respective frame.

When the frames and the data packets contained therein pass through a network device, they are subject to a delay (i.e. a propagation time). This delay can take on various values, if, for example, in a first scenario a first data packet passes through the network device on a first transfer path between input and output stage of the network device, causing a first delay, and a second data packet associated with the first data packet passes through on a second transfer path causing a second delay. The two transfer paths can, for example, lead over various modules of a switching matrix, input/output modules and cable strings, which with a more complex structure of the network device can easily be arranged spatially far apart, so, for example, the first data packet has to cover a 200 meters longer transfer path in the network device than the second data packet. However, two data packets are, due to different transfer paths, no longer in the same phase relation to one another at the output stage of the network device as at the input stage.

A second scenario relates to a network device with redundant devices, for example, with double switching matrices and double cable strings between input and output stage of the network device. The data packets pass through a first transfer path between input and output stage and in parallel through a second transfer path as a data packet copy. Ideally, at the output stage it should be possible at any time to switch over without loss of data from the first to the second transfer path and vice versa. This requires, however, that a data packet and its copy must be available exactly synchronously on the output side of the output stage. As a result of the first and second transfer paths possibly causing different delays, this is, however, not possible. It would admittedly be possible to construct the transfer paths of the network device in such a way that they cause perfectly identical delays by using identical switching matrices and cables of identical length and kind. However, this causes a considerable expense, if, for example, modules arranged directly side by side have to be connected via a cable of, e.g. 200 meters in length.

SUMMARY OF THE INVENTION

It is therefore an object of the present invention to provide a network device and a method for delay compensation of data packets, which can pass through the network device on several transfer paths, so a defined delay behaviour of the respective data packets during passing through the network device is guaranteed.

This object is achieved by a network device, in particular for a telecommunications network with synchronous digital hierarchy, for delay compensation of data packets, which delay occurs during passage of the data packets through an input stage and an output stage of the network device. The output stage of the network device is connected to the input stage via a first transfer path and via a second transfer path. A first delay is caused by the first transfer path and a second delay is caused by the second transfer path. The data packets are transferred in multiplex frames, each containing at least one data packet to be transferred, as well as at least one phase reference identifier for determining the respective position of the data packet within the corresponding frame. According to the invention, the network device has a phase correcting means for adjusting the phase reference identifier allocated to a respective data packet by a predetermined phase correcting value, leading in the phase, which corresponds to a maximum expected delay for a transfer of the data packets on the first transfer path or the second transfer path, and a buffer means for buffering the data packets by buffering times such that for each respective data packet its buffering time and its delay actually needed for passing through the network device in total correspond to the maximum expected delay taken into account in its allocated, adjusted phase reference identifier.

The object is therefore based on the idea that the network device adjusts the phase reference identifier allocated to a respective data packet by a predetermined phase correcting value, leading in the phase, which corresponds to a maximum expected delay for transfer of the data packets on the first or the second transfer path. The maximum possible delay for passing through the network device is therein, so to speak, "programmed into" the phase reference identifier, for example a delay occurring on a transfer path of approximately 200 meters between input and output stage, if the modules of the network device are arranged spatially far apart. The phase reference identifier is changed in such a way that the data packets are further leading in phase, in order to balance the maximum expected delay. The actual position of the respective data packet to the frame containing the phase reference identifier is also modified.

The delay between input and output stage can actually, however, be far smaller than provided in the modified phase reference identifier, so the data packets transferred on the first transfer path cover, for example, only 3 meters, while the data packets on the second transfer path pass through a distance of 180 meters through cables and modules. To match the actual delay to the maximum expected delay already taken into account in the phase reference identifier and thus finally to balance delay differences occurring on the different transfer paths of the network device, the network device buffers the data packets, for example in buffer memories serving as buffer means, so that the total delay actually needed for passing through the network device corresponds to the maximum expected delay taken into account in the phase reference identifier allocated to a data packet.

The invention can advantageously be used in any system in which data packets are transferred in a time division multiplexed fashion and can be displaced within frames or containers in relation to their respective phase. In a preferred embodiment the invention is used in a network device of a transmission network with synchronous hierarchy, for example in a cross-connect of an SDH transmission network (SDH=synchronous digital hierarchy) or in a SONET device (SONET=Synchronous Optical Network). Such networks are defined in ITU-T G.707 (2000), which is incorporated by reference herein. The multiplex frames are then SDH frames and the phase reference identifiers are contained in the control information of the SDH frames. The data packets are transmitted in virtual containers or form virtual containers, which are contained in corresponding SDH frames and are displaceable in relation to the phase.

It is in principle also conceivable that one or more data packets are transported in frames designated as containers, wherein the data packets are displaceable in the containers in relation to the phase and in which a correspondingly adjustable phase reference identifier is provided.

Further advantageous configurations of the invention are found in the dependent claims and in the description.

In principle the buffer means can be adjusted to the, in particular spatial, circumstances given by a suitable structure, for example by a depth of memory, predetermined or able to be set by configuration data. It is, however, advantageous, in relation to the expense of configuration, if the buffer means ascertain the delay of the data packets actually needed for passing through via the at least one first or the second transfer path and to adjust the respective buffering time to the delay actually needed. This can be done, for example, with the aid of a reference clock, provided to the buffer means by the network device.

The invention can advantageously be used in any network device, which, for example, owing to a modular structure, with several possible internal transfer paths has different delay behaviour. This is the case in particular if the network device is constructed as a redundant network device, wherein the at least one first transfer path leads over at least one first device, which, e.g. is a switching matrix with one or more matrix modules connected to one another via connecting leads, and the second transfer path is guided over at least one second device, redundant to the at least one first device, which in the example is also a switching matrix.

The maximum expected delay is advantageously ascertained substantially by means of maximum lengths of connecting leads arranged on the transfer paths. Advantageously, however, the delays caused by the other devices arranged on the respective transfer paths, for example the previously mentioned switching matrix, are also taken into account.

The input stage and the output stage allocated to it can be arranged on separate modules. Advantageously they are combined into one joint module or are formed by modules which preferably can be configured as both, input stage or output stage.

The input stage and the output stage can in principle only serve as input or output interface of the network device. Advantageously the input stage and the output stage already form stages of a switching matrix or are allocated to a switching matrix, so by connecting together the two stages a two-stage switching matrix can already be constructed.

Advantageously in addition a further matrix module is connected between the input and output stage constructed as matrix stages, so a three-stage matrix, referred to as a three-stage Clos matrix is formed.

Needless to say, in the network device also more than two or three matrix stages or other devices connected between the input and output stage can be provided.

The phase correcting means acting on the phase reference identifier can in principle be arranged in any way, e.g. allocated completely to the input stage or the output stage or else to a device arranged on the respective transfer paths between the input and output stage, for example a center stage module of a three stage switching matrix. Or part of the phase correction can be performed by the input stage and another part by the output stage or by some other means arranged on a transfer path of the network device.

The buffer means can also in principle be arranged in any way, similarly to the phase correcting means. For example, the buffer means could be allocated completely to the output stage, which then adjusts different delays of the data packets occurring on the respective transfer paths of the network device, for example in buffers on the input side, to the values taken into account in their corresponding phase reference identifiers.

It is also possible for the buffers to be arranged completely on devices arranged on the at least one first or second transfer path, for example on center stage modules of a switching matrix.

Advantageously, however, the buffers of the buffer means are arranged at different points of the network device, preferably on the input side of the output stage as well as on devices arranged on the transfer paths. The delay of a data packet is then increased by the buffers in such a way that the delay on a portion of the transfer path connected in series to the buffer and the buffering time in total correspond to an expected maximum delay. If, for example, a cable of 90 meters leads to a buffer of a first module and a second cable of 10 meters leads to a buffer of a second module and the expected delay is structured for a cable of 100 meters, the buffer allocated to the first cable has to buffer the received data packets for a delay occurring with a cable of 10 meters in length and the buffer allocated to the second cable for a delay occurring with a cable of 90 meters in length.

BRIEF DESCRIPTION OF THE DRAWINGS

The invention and its advantages are illustrated below using an embodiment example with the aid of the drawings.

DETAILED DESCRIPTION OF THE INVENTION

Figure 1:
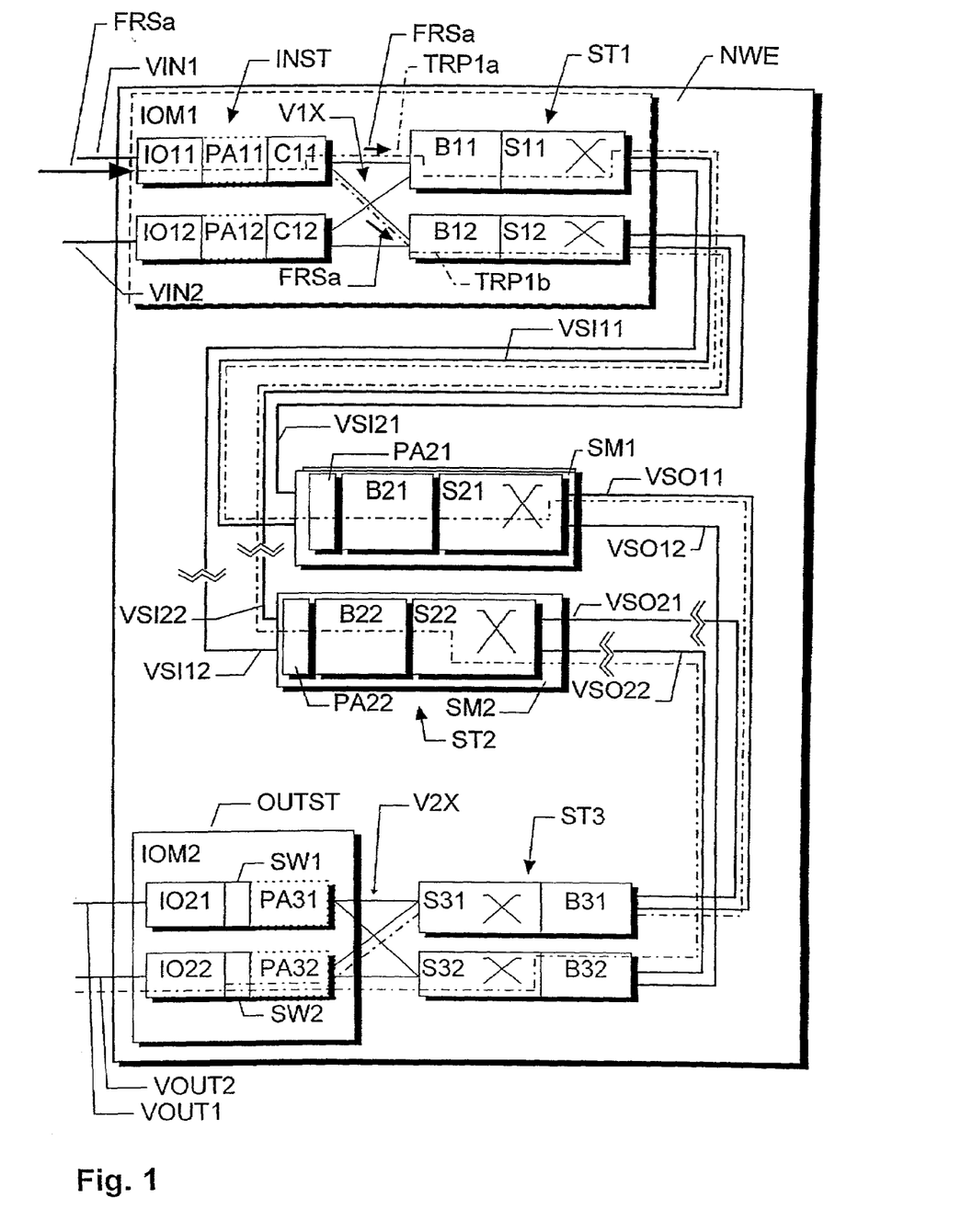
FIG. 1 shows schematically a network device NWE according to the invention, with an input stage INST and an output stage OUTST as well as matrix stages ST1, ST2, ST3.

The network device NWE shown schematically in FIG. 1 has an input stage INST and an output stage OUTST as well as matrix stages ST1, ST2, ST3 connected between the input stage INST and the output stage OUTST, which form a three-stage Clos matrix. The network device NWE is, for example, a cross-connect for an SDH transmission network, on which data packets are transferred in so-called SDH frames, referred to as synchronous transport modules (STM). From the SDH transmission network transmission lines VIN1, VIN2 lead to input ports IO11, IO12 of the input stage INST. On the output side the network device NWE is connected to transmission lines VOUT1, VOUT2 of the SDH transmission network via output ports IO21, IO22 of the output stage OUTST. By means of the matrix stages ST1, ST2, ST3 the network device NWE can switch any number of internal transfer paths for data packets between the input ports IO11, IO12 and the output ports IO21, IO22. Transfer paths TRP1*a*, TRP1*b* are shown as examples. The transmission lines VIN1, VIN2, VOUT1, VOUT2 serve as examples for not shown further transmission lines and the input/output ports IO11, IO12, IO21, IO22 serve as examples for, not shown, further input/output ports of the network device NWE.

Matrix stage ST1 contains the matrix modules S11, S12, each of which can receive data streams with data packets from each of the input ports IO11, IO12 via connecting leads V1X. The input ports IO11, IO12 can demultiplex the respective data streams and thus extract the data packets contained therein from the data streams. The input ports IO11, IO12 can, if necessary, further multiplex these data packets again on to internal data streams, e.g. passing through the network device NWE. The internal data streams preferably have a higher clock frequency than the external data streams. In the embodiment example, however, for reasons of simplicity external and internal data streams flowing in the network device NWE are constructed and clocked in the same way.

The data packets received from the input ports IO1, IO12 are buffered on the input side of matrix stage ST1 in buffers B11, B12 acting as buffer means, which are allocated to and connected in series to the matrix modules S11, S112. Matrix module S11 and buffer B11, owing to an advantageous configuration of the invention, are redundant to matrix module S12 and buffer B12 and spatially separated from them.

Needless to say, for simplification of the illustration matrix modules S11, S12 and buffers B11, B12 serve only as examples of an arrangement of matrix modules and can be formed, for example, by a single or by several electrical and/or optical matrix boards. The same applies by analogy to the input ports IO11, IO12, which can be arranged, e.g. on separate electrical and/or optical boards comprising further input ports.

Matrix stage ST2 contains matrix modules S21, S22, which comprises buffers B21, B22, acting as buffer means, as well as pointer processors PA21, PA22, acting as phase correcting means, for adjusting phase reference identifiers, allocated to the data packets passing through matrix stage ST2. The pointer processors PA21, PA22 are arranged on the input side of matrix stage ST2. Pointer processor PA21 and thus matrix module S21 are connected to matrix modules S11 or S12 via connecting leads VSI11, VSI21 and pointer processor PA22 and thus matrix module S21 are connected to matrix modules S11 or S12 via connecting leads VSI12, VSI22. Buffers B21, B22 serve to adjust matrix modules S31, S32 to possibly different delays, caused by the existing different lengths of connecting leads VSI11, VSI12, VSI21, VSI22.

However, one matrix module S21, S22, one buffer B21, B22 and one pointer processor PA21, PA22 form in the present case one matrix unit SM1, SM2 and are, e.g. arranged on an electrical and/or optical board or are formed from one constructional unit with several boards of this kind. Matrix units SM1, SM2 are matrix units redundant to one another, which are constructed identically and can perform identical functions. Matrix units SM1, SM2 can, however, comprise one or more electrical or optical boards.

On the output side connecting leads VSO11, VSO12 lead from matrix module S21 to matrix modules S31, S32 of matrix stage ST3. Connected in series to this on the input side is a buffer B31, B32, acting as buffer means. From matrix module S22 connecting leads VSO21, VSO22 lead to buffers B31, B32 connected in series to matrix modules S31, S32. Buffers B31, B32 serve for adjusting matrix modules S31, S32 on the input side to possibly different delays, caused by the existing different lengths of connecting leads VSO11, VSO12, VSO21, VSO22. Matrix module S31 and the buffer B31 allocated to it on the one hand and matrix module S32 and its buffer B32 on the other hand are structured as separate constructional units and redundant to one another. For reasons of redundancy these constructional units are advantageously arranged spatially apart. A constructional unit of this kind can be formed by one or more electrical and/or optical devices, e.g. electro-optical boards.

On the output side matrix stage ST3 is connected to the output stage OUTST via connecting leads VS2X, so from each of the matrix modules S31, S32 a connection can be constructed to each of the output ports IO21, IO22 and thus data packets can be sent to each output port IO21, IO22.

For reasons of operational safety matrix units SM1, SM2 are arranged spatially apart from one another, wherein matrix unit SM1 is arranged, e.g. in a room together with the input stage INST and matrix unit SM2 in a separate room. An arrangement of this kind, spatially distanced, is designated as "room protection". Between the rooms and thus between the components of the network device NWE arranged in each of the rooms considerable distances have to be bridged, which can, for example, have a length of up to 200 meters. Corresponding to the spatial arrangement of matrix stages ST1, ST2, ST3, the connecting leads VSI11, VSI12, VSI21, VSI22 and VSO11, VSO12, VSO21, VSO22, constructed as electrical or optical connections, are of different lengths and cause delays of data packets, transferred on them differing from one another. The connecting leads VSI12, VSI22, VSO21, VSO22, leading to matrix unit SM2, are in the present case in comparison with connecting leads VSI11, VSI21, VSO11, VSO21, leading to matrix unit SM1, approximately 200 meters longer, as indicated in FIG. 1 by interrupted lines.

The network device NWE also comprises further devices, not illustrated, for example a central control module or board, an interface to a network management system and one or more clock generator modules, which supply the modules shown, for example matrix modules S11, S12, S21, S22, S31, S32, with a master clock signal and a slave clock signal redundant to this. The respective internal master/slave clock signals are formed by the, not shown, clock generator modules using external clock signals, derived from a received data signal at one of the input ports IO11, IO12. The external clock signals are, for example, contained in STM frames. The internal master/slave clock signals contain on the one hand so-called frame clock signals, which are transferred, for example, at a bit rate of 2 megabits per second and comprise several frame clocks, e.g. one at one Hz and one at 8 kHz. The internal master/slave clock signals additionally advantageously contain simple clock signal pulses, e.g. with a frequency of 2.43 MHz, typical for SDH, for fine synchronisation of the components of the matrix stages ST1, ST2, ST3 and of the input and output stages INST, OUTST.

Figure 3:
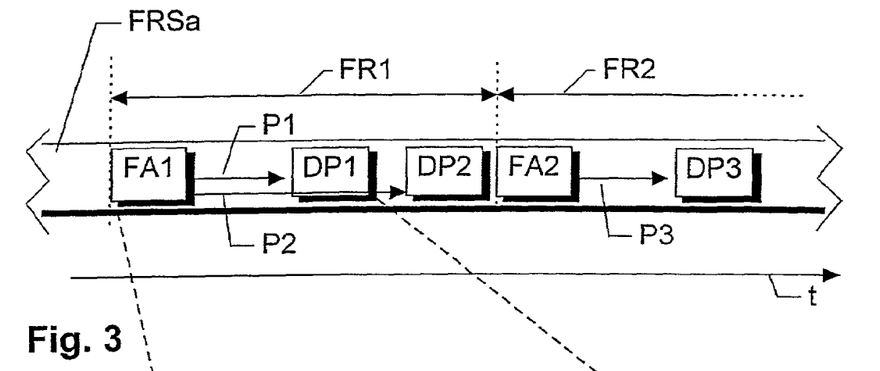
FIG. 3 shows a data stream FRSa with frames FR1, FR2 and data packets DP1, DP2, DP3 transferred therein.

The network device NWE receives, e.g. on the transmission line VIN1 a time division multiplexed data stream FRSa, which is shown in FIG. 3 over a time axis t. In data stream FRSa data packets DP1, DP2, DP3, designated as virtual containers, are transferred in SDH frames FR1, FR2, so-called synchronous transport modules. Data packet DP3, forming a so-called payload of the frame FR2, can be, for example, a so-called VC-4 container. In the SDH frames FR1, FR2 frame headers FA1, FA2, designated as overheads, are provided, which form a pattern in the data stream FRSa, recurring cyclically with the frame clock cycle, and in which are contained phase reference identifiers P1, P2, P3 for determining the respective position of the data packets DP1, DP2; DP3 within the frames FR1, FR2.

The network device NWE receives the data stream FRSa at the input port IO11. For example by means of a destination identifier contained in the frame FR1 or the data packets DP1, DP2 or by means of pre-setting by a network management system, not shown, the network device NWE ascertains that the data stream FRSa and thus the data packets DP1, DP2 are to be transferred to the output port IO22. The present network device NWE, operating as an SDH cross-connect, leads the entire data stream FRSa from the input port IO11 to the output port IO22. Transfer path TRP1$a$, which leads via the matrix modules S11, S21, S31, is, for example, suitable for this.

To simplify the following embodiments the data stream FRSa, received from outside on the connection VIN1, is not modified below by the input stage INST, for example multiplexed into a faster clocked internal data stream, and forwarded to matrix stage ST1 as an internal data stream.

For reasons of redundancy a second transfer path TRP1$b$ is additionally provided, leading over matrix modules S11, S22, S32, which is an independent transfer path, redundant to transfer path TRP1$a$ and leading over redundant devices. By contrast to transfer path TRP1$a$, transfer path TRP1$b$ is longer, however, so data packets DP1, DP2 in a transfer on transfer path TRP1$b$ arrive later at the output port IO22 than in a transfer on transfer path TRP1$a$, if the measures according to the invention, explained below, are not applied.

A distributing module C11, allocated to the input port IO11, transmits on the one hand data stream FRSa on transfer path TRP1$a$ to matrix module S11 and on the other hand a data stream copy FRSb of data stream FRSa to matrix module S12. A distributing module C12, corresponding in its function to the distributing module C11, is allocated to the input port IO12.

Figure 5:
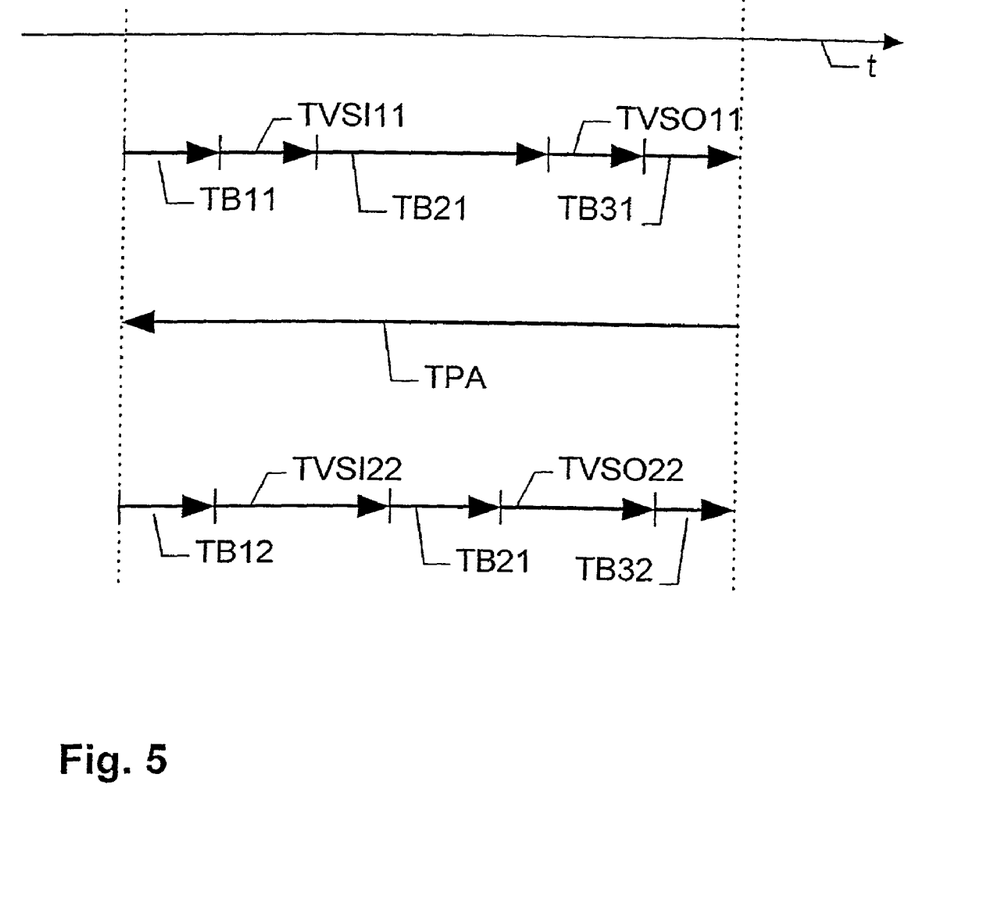
FIG. 5 shows an illustration of buffering times and delays in the network device NWE.

In as far as delay differences occur on the connecting leads V1X during transfer of data streams FRSa, FRSa2, these are balanced by the buffers B11, B12. Buffers B11, B12 therein delay the data streams FRS, FRSc by buffering times TB11, TB12 (FIG. 5). Buffers B11, B12 contain, for example, shift registers, the memory depth of which is dimensioned accordingly for delays occurring on the connecting leads V1X. The respective memory depth can also be configurable, wherein, for example, on constructing the network device NWE the lead lengths of the connecting leads V1X are ascertained and configuration data corresponding to these lengths are loaded into the network device NWE for configuration of the buffers B11, B12. Advantageously, however, buffers B11, B12 are adaptive buffers, which ascertain the necessary buffering times according to the lead lengths of the connecting leads V1X, e.g. by means of the above-mentioned frame clock signal or some other reference signal and are set to the respective lead lengths. For this purpose buffers B11, B12 are, for example, equipped as memories, the memory cells of which are scanned by means of a multiplexer. The memory cells to be scanned can be pre-provided to the multiplexer, for example by circulating counters, the respective starting values of which are set according to the lead lengths of the connecting leads V1X.

Needless to say, with equal lead lengths of the connecting leads V1X the buffers B11, B12 are not absolutely necessary and the buffers B11, B12 could also be allocated to the input stage INST.

Figure 2:
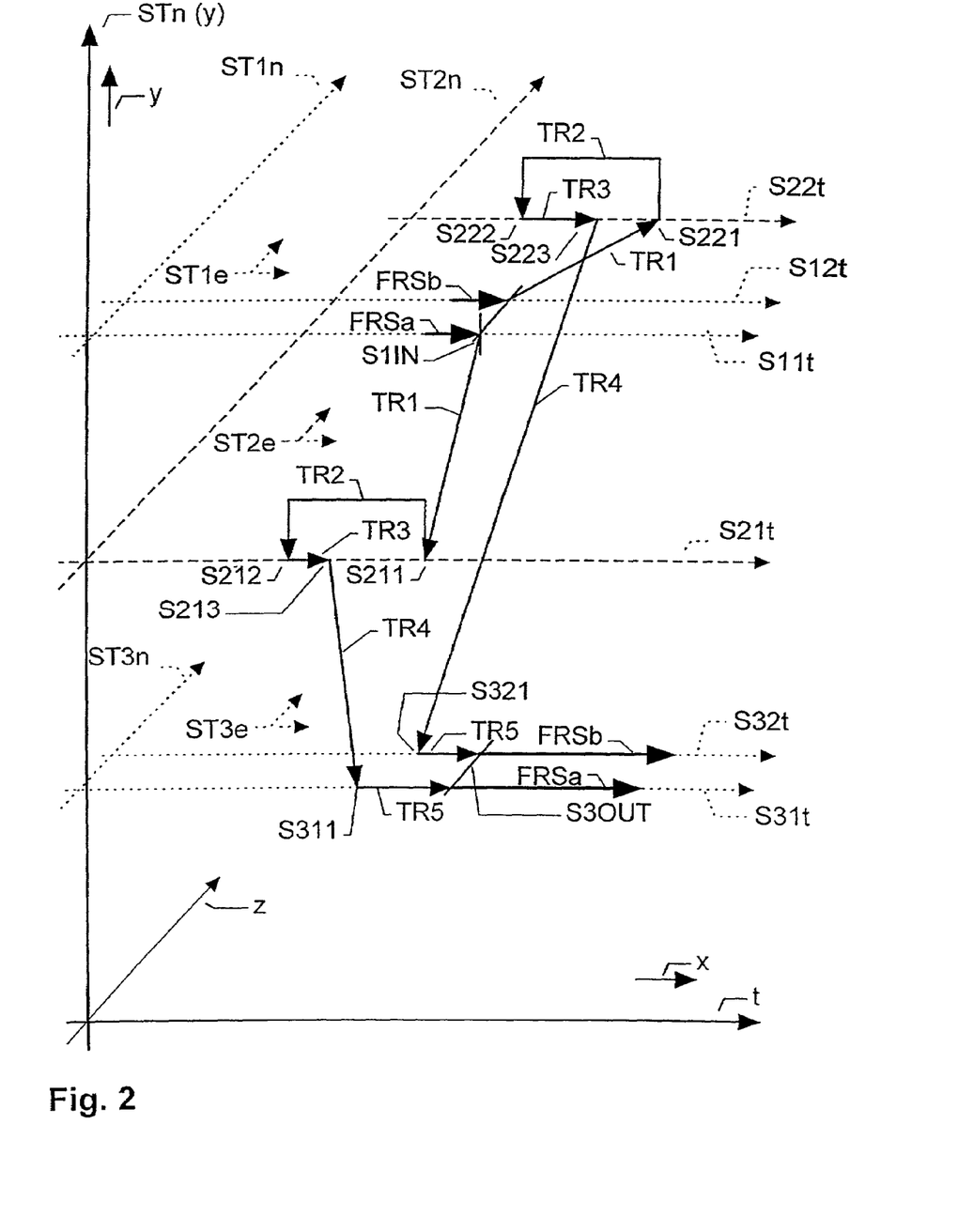
FIG. 2 shows a schematic illustration of the embodiment of the method according to the invention.

FIG. 2 illustrates the synchronous reception S11N of the data streams FRSa, FRSb at the matrix modules S11, S12 of matrix stage ST1 thanks to buffers B11, B12. FIG. 2 is a three-dimensional diagram with a time axis designated as "t" and with time axes S11$t$, S12$t$; S21$t$, S22$t$; S31$t$, S32$t$ respectively allocated to the matrix modules S11, S12; S21, S22; S31, S32, pointing in the X-direction. Allocated to each of the matrix stages ST1, ST2, ST3 is a horizontal plane ST1$e$, ST2$e$, ST3$e$, located on top of one another along a Y-axis designated as STn. In the Z-direction extend axes ST1$n$, ST2$n$, ST3$n$, which together with time axes S11$t$, S21$t$, S31$t$ span planes ST1$e$, ST2$e$, ST3$e$, in which time axes S12$t$; S22$t$, S32$t$, parallel to time axes S11$t$, S21$t$, S31$t$, are located.

The data streams FRSa, FRSb are transmitted from the matrix modules S21, S22 to matrix stage ST2 in transmission processes designated as TR1. The inputs of the data streams FRSa, FRSb in the pointer processors PA21, PA22 are designated as S211, S221. Due to the greater lead length of connecting lead VSI22 in comparison with connecting lead VSI11, data stream FRSb compared with data stream FRSa needs a greater delay for transfer from matrix stage ST1 to matrix stage ST2 and is thus displaced with respect to this by a phase difference.

The pointer processors PA21, PA22 form phase correcting means for adjusting phase reference identifiers, allocated to data packets contained in the data streams FRSa, FRSb. The pointer processors PA21, PA22 modify the phase reference identifiers by pre-determined phase correcting values, leading in the phase, which correspond to a maximum expected delay TPA during transfer of the data packets on transfer paths TRP1$a$, TRP1$b$. The adjustment of the phase reference identifiers is designated as TR2 in FIG. 2.

By means of FIGS. 4$a$, 4$b$ an adjustment of this kind of the phase reference identifiers is explained using the example of frame FR1 explained in connection with FIG. 3.

On the input side of pointer processor PA21, data packet DP1 has a phase relation P1 with respect to the frame header FA1, which phase relation is recorded in the header as a so-called pointer P1. Pointer processor PA21 now changes the phase relation between the frame header FA1 and the data packet DP1, as a result of which the data packet DP1 is, so to speak, moved chronologically into the past. In the specific case the frame head FA1 is moved closer towards the data packet DP1 and the pointer P1 is at the same time shortened to a shorter pointer P1$m$, which the pointer processor PA21 records in the frame header FA1. In principle data packet DP1 could therein also be shifted into a different frame, if the desired phase correction is not possible within frame FR1.

Pointer processor PA22 operates on the frames, phase reference identifiers and data packets contained in the data stream FRSb identically by analogy. However, pointer processors PA21, PA22 correct the respective phase relations by identical, pre-determined fixed values, which correspond, as it were, to the "worst case", namely the maximum occurring delay TPA (FIG. 5) during transfer of data streams FRSa, FRSb in the network device NWE, in the present case the delay occurring on transfer path TRP1b.

The reception of data streams FRSa, FRSb, the data packets of which have been virtually shifted into the future, at buffers B21, B22 are designated in FIG. 2 as S212, S222. Buffers B21, B22 buffer the data streams FRSa, FRSb in buffering processes TR3 by buffering times TB21, TB22. This process is pictorialised for buffer B21 in FIG. 4c, in which frame FR1 is delayed in total by a buffering time TB21.

Figure 4A:
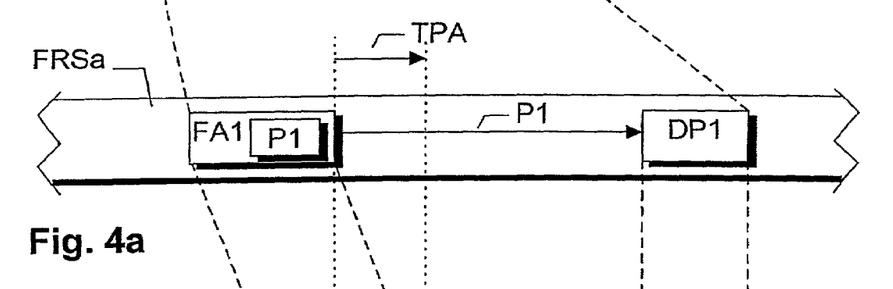
FIGS. 4a, 4b, 4c show a modification of a phase reference identifier and a buffering of the data packet DP1 contained in the frame FR1 from FIG. 3, using the method from FIG. 2.
Figure 4B:
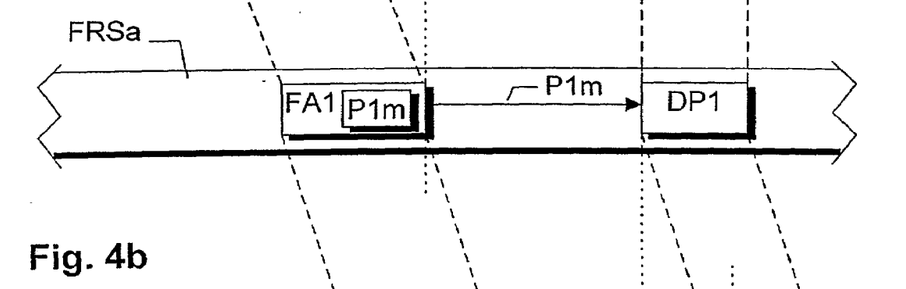
Figure 4C:
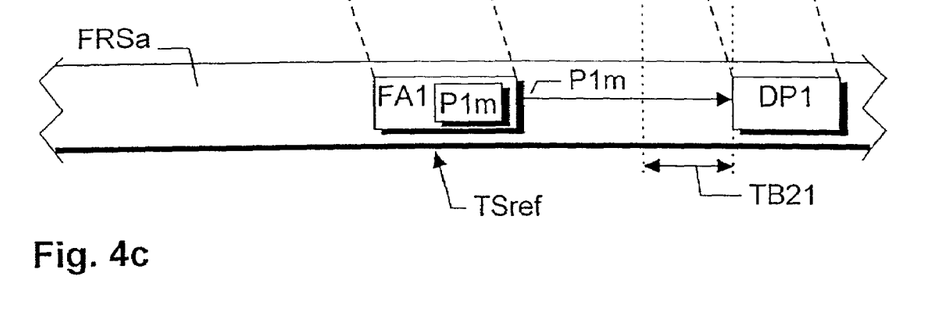

At this point it should be noted that the relations shown in FIG. 4 and FIG. 5 are neither true to scale with one another nor in total reproduce the actual chronological circumstances of the network device NWE. The arrow lengths shown are for pictorialisation in particular in relation to the buffering times longer than in reality, in particular in relation to the delays shorter.

The buffering times TB21, TB22 of buffers B21, B22 are dimensioned differently and provide that the different delays TVSI11, TVSI12 needed on the connecting leads VSI11, VSI22 are compensated on the input side of matrix modules S21, S22 of matrix stage ST2 and the data streams FRSa, FRSb arrive synchronously at matrix modules S21, S22. The respective reception of the data streams FRSa, FRSb at matrix modules S21, S22 is designated as S213 or as S223.

Matrix modules S21, S22 transmit the data streams FRSa, FRSb in transmission processes TR4 to matrix stage ST3, where they enter at buffers B31, B32 allocated to matrix modules S31, S32. The respective receptions are designated as S311 or S321. Buffers B31, B32 have substantially the same function as buffers B21, B22, namely to compensate delays of connecting leads connected in series, in the present case delays TVSO11, TVSO22, of connecting leads VSO11, VSO22, of different lengths, so that the data streams FRSa, FRSb arrive synchronously at the matrix modules S31, S32 of matrix stage ST3. The buffering processes with accordingly shorter buffering time TB31 of buffer B31 and longer buffer time TB32 of buffer B32 are designated as TR5 in FIG. 2.

In the embodiment example the data streams FRSa, FRSb leave matrix stage ST3 in a transmission process S30UT synchronously and with phase relations between the frames and data packets contained therein correlating to each other. Matrix module S31 transmits data stream FRSa and matrix module S32 transmits data stream FRSb to the output port IO22 of the output stage OUTST. Selection means SW2 are connected ahead of the output port, which select at any time one data stream from the received synchronous data streams FRSa, FRSb, which is free of errors. If, for example, a problem occurs on transfer path TRP1a, e.g if matrix module S21 fails, the selection means SW2 can switch over from data stream FRSa to data stream FRSb without a phase jump and forward data stream FRSb to output port IO22.

A selection means SW1, corresponding in function to selection means SW2, is allocated to output port IO21. Additionally, buffers can be connected in series to the output ports IO21, IO22, which if necessary compensate different delays caused by connecting lead V2X. Buffers B21, B22, B31, B32 are, like buffers B11, B12, of fixed configuration, configurable or preferably adaptive buffers, which are adjusted to the delays of the corresponding data streams transferred caused by connecting leads or other devices. In total buffers B11, B12, B21, B22, B31, B32 form buffer means according to the invention, which serve to adjust in total the delay actually needed by the data packets transferred in data streams FRSa, FRSb for passing through the network device NWE to the maximum expected delay taken into account in the phase reference identifiers allocated to them, e.g. the phase reference identifier P1M.

Further variants of the invention are easily possible.

Needless to say, the buffer means could also be provided in only one of the matrix modules ST1, ST2, ST3.

Buffer means according to the invention could also be provided in the output stage OUTST. The buffer means would, for example, be connected in series to the output ports IO21, IO22 and would supplement the delays occurring on the transfer paths, for example, transfer paths TRP1a, TRP1b, by suitable buffering times, so that the delays and buffering times in total would correspond to the delays taken into account in the phase reference identifiers.

Instead of the phase correcting means PA21, PA22 arranged in matrix stage ST2, phase correcting means could alternatively be provided in the input stage. This is indicated in FIG. 1 by the pointer processors PA11, PA12 allocated to the input ports IO11, IO12.

It is also possible for pointer processors PA11, PA12 to cooperate with pointer processors PA21, PA22 and for each pointer processor PA11, PA12, PA21, PA22 to perform only a part of a phase correction.

In a further variant of the embodiment example, pointer processors PA31, PA32 are allocated to the output ports IO21, IO22, which is indicated by broken lines. The pointer processors act as phase correcting means for adjusting phase reference identifiers and modify the phase reference identifier of data packets received from the output stage OUTST by a phase correcting value leading in the phase. Phase correcting means PA31, PA32 can cooperate with phase correcting means PA11, PA12 and/or PA21, PA22 and perform only a part of the necessary adjustment of the phase reference identifiers. Alternatively, pointer processors PA31, PA32 could be provided alone instead of phase correcting means PA11, PA12 and/or PA21, PA22 and thus carry out the full adjustment of the phase reference identifiers.

It is also possible that the input stage INST and the matrix stage ST1 or corresponding parts of input and matrix stages are combined into one joint input module IOM1 or several input modules of this kind, designed as an electric board.

In another variant, matrix module S11 is allocated to input port IO11 and matrix module S12 is allocated to input port IO12. In the same way matrix module S31 and output port IO21 and matrix module S32 and output port IO22 could also be allocated to one another and possibly also be combined into one constructional unit.

In principle the input stage INST and matrix stage ST1 can also be constructed as constructionally separate units. Further, e.g. on the one hand matrix module S11 and input port IO11 and on the other hand matrix module S12 and input port IO12 could also be combined into respective constructional units.

The input ports IO11, IO12 and the output ports IO21, IO22 could be provided on a joint module with universal input/output ports, which can be configured according to requirement as either input ports or output ports.

Matrix stages ST1 and ST3, which act, so to speak, as an matrix final stage, could also be combined into one constructional unit and/or be formed by identical modules, adjustable for the respective function as matrix stage ST1 or ST3. Advantageously, for reasons of redundancy, matrix modules S11 and S31 on the one hand and S12 and S32 on the other hand are then combined into one constructional unit.

The components shown such as for example the buffers B11, B12, B21, B22 or the pointer processors PA21, P122, of the network device NWE can be implemented as hardware, for example as integrated circuits, as so-called Field Programmable Gate Arrays (FPGA) or as Application Specific Integrated Circuits (ASIC). Some components or parts thereof can also be implemented as software in the form of one or more program modules, the program code of which can be carried out, e.g. by a control processor of an matrix module or some other processor arrangement.

Needless to say any combinations of the measures and arrangements disclosed in the claims and in the description are also possible.

What is claimed is:

1. A network device for a telecommunications network with synchronous digital hierarchy, for delay compensation of data packets, the network device comprising:
    an input stage and an output state, where delay occurs during passage of the data packets through the input stage and the output stage of the network device,
    a first transfer path and a second transfer path connecting the input stage to the output stage, where a first delay occurs on the first transfer path and a second delay occurs on the second transfer path, and where the data packets are transferred in multiplex frames, each containing at least one data packet to be transferred and at least one phase reference identifier for determining the respective position of the data packet within the corresponding frame;
    phase correcting means for adjusting the phase reference identifier allocated to a respective data packet by a predetermined phase correcting value, leading in the phase, which corresponds to a maximum expected delay for a transfer of the data packets on the first transfer path or the second transfer path; and
    buffer means for buffering the data packets by buffering times such that for each respective data packets, buffering time and delay needed for passing through the network device, in total correspond to the maximum expected delay taken into account in allocated, adjusted phase reference identifier of respective data packet.

2. A network device according to claim 1, wherein the buffer means determines the delay of the data packets needed for passing through via the first transfer path or the second transfer path and adjust the respective buffering time to the needed delay.

3. A network device according to claim 1, wherein the maximum expected delay is substantially determined based on maximum lengths of connecting leads used for at least one of the first transfer path and the second transfer path.

4. A network device according to claim 1, being constructed as a redundant network device wherein the first transfer path is guided via a first device and the second transfer path via a second device, redundant to the first device.

5. A network device according to claim 4, wherein the first device and the second device comprising a first or a second switching matrix, respectively.

6. A network device according to claim 5, wherein the first switching matrix and the second switching matrix, each matrix comprising a first matrix module and a second matrix module, connected to one another via a connecting lead.

7. A network device according to claim 1, wherein the input stage and the corresponding output stage are combined into a joint module and/or the input stage and the output stage are constructed as matrix stages of a multi-stage switching matrix.

8. A network device according to claim 1, wherein the phase correcting means are allocated entirely or partially to the input stage or to the output stage.

9. A network device according to claim 1, wherein the buffer means comprises buffers arranged on one of: an input side of the output stage, on an input side of the first transfer path, and on the second transfer path.

10. A network device according to claim 1, wherein the multiplex frames are SDH frames and the phase reference identifiers are contained in the control information of the multiplex frames and the data packets are virtual containers or are transferred in virtual containers.

11. A method for delay compensation of data packets, for a telecommunications network with synchronous digital hierarchy, which delay occurs during passage of the packets through a network device comprising an input stage and an output stage, connected to the input stage via a first transfer path and a second transfer path, the method comprising:
    transferring the data packets in multiplex frames, where a first delay occurs on the first transfer path and a second delay occurs on the second transfer path, and where each of the multiplex frames contains at least one data packet to be transferred and at least one phase reference identifier for determining the respective position of the data packet within the corresponding frame;
    adjusting the phase reference identifier allocated to a respective data packet by a predetermined phase correcting value, leading in the phase, which corresponds to a maximum expected delay for a transfer of the data packets on the first transfer path or the second transfer path; and
    buffering the data packets by buffering times such that for each respective data packet buffering time and delay needed for passing through the network device in total correspond to the maximum expected delay taken into account in allocated, adjusted phase reference identifier.

12. A program module stored on a computer readable medium for a network device comprising program code means which carry out the method according to claim 11 when run by a control means of the network device.

13. The program module according to claim 12, wherein the computer readable medium comprises at least one of a diskette, CD-ROM, Digital Versatile Disk and Hard disk drive.

14. A network device for processing digital data streams composed of frames, each containing at least one data packet and at least one corresponding phase reference identifier indicating the position of the data packet within its frames, the network device comprising:
    compensation module compensating a delay of said data packet occurring during passage of the data packet through the network device, said compensation module comprising:
        phase correcting means for adjusting the phase reference identifier by a predetermined phase correcting value, which corresponds to a maximum expected delay for passage of the data packet through the network device and
        buffer means for buffering the data packet for a predetermined buffering time such that buffering time and delay needed for passing through the network device in total correspond to the maximum expected delay.

15. A network device for a telecommunications network with synchronous digital hierarchy, for delay compensation of data packets, the network device comprising:
- an input stage having a first matrix unit and receiving data packets transferred in multiplex frames together with at least one phase reference identifier for determining the respective position of the data packet within the corresponding frame;
- an output stage having a second matrix unit and receiving data packets of the multiplexed frames propagated within the network device; and
- a first transfer path and a second transfer path connecting the input state to the output stage, where a first propagation delay occurs on the first transfer path and a second propagation delay occurs on the second transfer path, wherein each of the first and second matrix units comprise:
- a pointer processor adjusting the phase reference identifier allocated to a respective data packet by a predetermined phase correcting value, leading in the phase, which corresponds to a maximum expected delay for a transfer of the data packets on a longest transfer path out of the first transfer path and the second transfer path, and
- a buffer buffering the data packets, where each data packet is buffered for a buffering time that corresponds to the maximum expected delay minus time needed to pass respective data packet through a respective transfer path, wherein said buffering time is determined based on the adjusted phase reference identifier of the respective data packet.

16. The network device according to claim 15, further comprising at least one intermediate stage, wherein the first transfer path and the second transfer path comprise multiple transfer paths connecting the input stage to a first intermediate stage, connecting the intermediate stages to each other, and connecting a last intermediate stage to the output stage, wherein each intermediate stage has a third matrix and wherein the third matrix comprises the pointer processor and the buffer.

17. The network device according to claim 16, wherein the maximum expected delay is a value indicating longest time needed to propagate a data packet through a longest transfer path out of all multiple transfer paths within the network device.

18. The network device according to claim 15, wherein the maximum expected delay is a value indicating longest time needed to propagate a data packet through the longest transfer path.

* * * * *